(12) United States Patent
Isozaki et al.

(10) Patent No.: US 6,303,701 B1
(45) Date of Patent: Oct. 16, 2001

(54) STAINPROOF RESIN COMPOSITION AND PRODUCTION METHOD THEREFOR

(75) Inventors: Osamu Isozaki; Shigeo Nishiguchi, both of Hiratsuka (JP)

(73) Assignee: Kansai Paint Co., Ltd. (JP)

( * ) Notice: Subject to any disclaimer, the term of this patent is extended or adjusted under 35 U.S.C. 154(b) by 0 days.

(21) Appl. No.: 09/333,024

(22) Filed: Jun. 15, 1999

Related U.S. Application Data

(63) Continuation of application No. 08/620,333, filed on Mar. 22, 1996, now abandoned.

(30) Foreign Application Priority Data

Mar. 24, 1995 (JP) ......................................................... 7-54903

(51) Int. Cl.$^7$ ...................................................... C08F 8/12
(52) U.S. Cl. ....................................... 525/330.2; 523/122
(58) Field of Search ........................ 523/122; 525/330.2; 524/819, 823, 845

(56) References Cited

U.S. PATENT DOCUMENTS

| | | | |
|---|---|---|---|
| 3,969,434 | * 7/1976 | Powell | 260/897 |
| 4,870,197 | 9/1989 | Gutierrez et al. | 556/114 |
| 5,319,018 | 6/1994 | Owen et al. | 524/556 |
| 5,439,512 | * 8/1995 | Kamijima et al. | 106/18.32 |
| 5,541,265 | * 7/1996 | Gomi | 525/366 |

* cited by examiner

Primary Examiner—Paul R. Michl
(74) Attorney, Agent, or Firm—Rader, Fishman & Grauer

(57) ABSTRACT

A stainproof resin composition comprising as an active ingredient a resin having at least one metal carboxylate group represented by the following formula:

$$Rp\text{—}COO\text{—}M\text{—}OH \qquad (A)$$

wherein Rp is a substrate resin and M is a divalent metal atom.

9 Claims, No Drawings

STAINPROOF RESIN COMPOSITION AND PRODUCTION METHOD THEREFOR

This application is a continuation, of application Ser. No. 08/620,333, filed Mar. 22, 1996 now abandoned.

BACKGROUND OF THE INVENTION

1. Field of the Invention

This invention relates to a stainproof composition comprising as an active ingredient a resin having at least one metal carboxylate group and a production method therefor.

2. Description of Related Art

Heretofore, resins having a metal salt structure in the molecule have been studied and implemented as binders for stainproof coatings. The most common resin having such a structure in the molecule is tin carboxylate. However, since the toxicity of tin carboxylate has been called in question, copper and zinc carboxylates have been used in recent years. These resins usually are represented by the following general formula (B) or (C):

Rp—COO—M—(R)$_n$ (B)

Rp—COO—M—(OCOR)$_n$ (C)

wherein Rp is a substrate resin, M is a divalent metal atom, R is a hydrocarbon group, and n is an integer of 1 to 3.

If a resin includes a hydroxyl group, traditionally such resins tend to gel during synthesis and become defective as stainproof resin compositions.

The synthesis of the compound of the formula (B) is costly and the synthesis of the compound (C) involves extremely high costs for purification because a mixture of various compounds is readily produced due to the small difference of reactivity between the two or more hydroxyl groups which are present.

SUMMARY OF THE INVENTION

It is therefore an object of the present invention to provide a stainproof resin composition having at least one metal carboxylate group and a production method therefor. It is also an object to provide a resin having excellent antibiotic stainproofing properties which is suitable for use in stainproof coatings.

In accordance with these objectives there is provided a stainproof resin composition comprising as an active ingredient a resin having at least one metal carboxylate group represented by the formula:

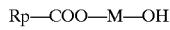
Rp—COO—M—OH wherein Rp is a substrate resin and M is a divalent metal atom.

In further accordance with these objectives, there is provided a method for producing a stainproof resin composition comprising as an active ingredient a resin having at least one metal carboxylate group represented by the formula:

Rp—COO—M—OH (A)

wherein Rp is a substrate resin and M is a divalent metal atom, the method comprising reacting a resin having at least one carboxyl group with a divalent metal oxide or a divalent metal hydroxide in the presence of water.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

In a preferred embodiment of the present invention, the divalent metal atom of the resin composition comprises at least one metal selected from copper, zinc, calcium, magnesium and iron. The substrate resin may be any resin having at least one carboxyl group and is preferably a vinyl polymer having an acid value of 30 to 300.

The inventors of the present invention have conducted intensive studies on an inexpensive stainproof resin composition having at least one metal carboxylate group and a production method therefor, and have found that a resin having the structure of the above general formula (A) can be synthesized without gelation by reacting a resin having at least one carboxyl group with a divalent metal oxide or hydroxide in the presence of water.

Generally, a three-dimensional structure may be generated by ion bonding when a divalent metal atom is employed. Surprisingly, gelation does not occur in the method according to the present invention when the resin is reacted with preferably 0.1 to 1 mol of a divalent metal oxide or divalent metal hydroxide for every 1 mol of the carboxyl group. In addition, the presence of a small amount of water may prevent the generation of a three-dimensional structure caused by ion bonding.

When there is 0.1 mol or less of water present for every 1 mol of carboxyl group present, structural viscosity may develop with the result being a likely increase in the viscosity of the resin. When 1 mol or more of water is present, excess water should be separated. Therefore, it is preferable that 0.1 mol to 1 mol of water be employed for every 1 mol of carboxyl group present. The generation of a carboxylate in the resin may be confirmed by an IR spectrum.

Any divalent metal oxide or divalent metal hydroxide is acceptable as the divalent metal oxide or divalent metal hydroxide used in the present invention, but an oxide or hydroxide of copper, zinc, calcium, magnesium or iron is preferred at least in part from the viewpoint of costs, toxicity, reactivity and the like.

Any resins having a carboxyl group in the molecule, such as polyesters, polyurethanes, natural resin and vinyl polymers are acceptable as the resin having a carboxyl group in the molecule used in the present invention, but vinyl polymers are preferred at least in part from the viewpoint of the freedom of changing composition and versatility. Average molecular weight of the resin can be 1,000 to 100,000, preferably, 1,500 to 50,000. The resin may contain one carboxyl group per molecule if it has a low molecular weight (e.g. 1,000–1,500). If a resin has a high molecular weight (e.g. 1,500–100,000), an acid value of 30 to 300 is preferred. In addition, for resins having a high molecular weight, there is preferably at least two carboxyl groups per molecule.

A method for producing a resin composition according to the present invention comprises the steps of adding preferably 0.5 to 5% by weight of water and a divalent metal oxide or divalent metal hydroxide to be polymerized to a resin having at least one carboxyl group. The components are preferably reacted at 50 to 200° C. for preferably 1 to 20 hours. The reaction temperature and times may vary depending on many factors such as environmental factors and the desired properties of the final product. If the system becomes turbid due to the presence of water, a small amount of a polar solvent may be added. Illustrative examples of the polar solvent include solvents based on alcohols such as n-butanol and isopropyl alcohol. In addition, solvents based on ketones such as methyl ethyl ketone and methyl isobutyl ketone or solvents based on esters such as ethyl acetate, butyl acetate and isobutyl acetate may be employed. Similarly solvents based on ethers, such as CELLOSOLVE, butyl CELLOSOLVE, diethylene glycol, diethylene glycol monoethylether and diethylene glycol monobutylether and the like, are also suitable. It should be noted that a powder metal compound may not dissolve at an initial phase of the reaction, but the reaction mixture will likely become transparent as the reaction proceeds.

The present invention is described in detail with reference to the following examples.

EXAMPLE 1

8 g of zinc oxide, 5 g of butanol and 1 g of water were added to butyl acetate solution of 50% by weight of a copolymer having a number average molecular weight of 10,000 and consisting of 7.2 parts by weight of acrylic acid, 50 parts by weight of methyl methacrylate and 42.8 parts by weight of ethyl acrylate and these substances were caused to react at 120° C. for 10 hours to obtain a transparent resin solution having a solid content of 49.2 % by weight. It was confirmed by an IR spectrum that the absorption of zinc carboxylate appeared remarkably at 1,630 $cm^{-1}$.

EXAMPLE 2

Succinic anhydride was added to 100 g of a polyester resin having a hydroxyl group at a terminal thereof and comprising adipic acid, neopentyl glycol and trimethylol propane to obtain a polyester resin having a number average molecular weight of 3,500 and an acid value of 56. To this resin were added 100 g of CELLOSOLVE, 2 g of calcium hydroxide and 2 g of water and these substances were caused to react at 100° C. for 10 hours to obtain a transparent resin solution having a solid content of 50.0 % by weight. It was confirmed by an IR spectrum that the absorption of calcium carboxylate appeared remarkably at 1,560 $cm^{-1}$.

Application Example

Each of the resin solutions obtained in Examples 1 and 2 was applied to an aluminum plate and dried so that the thickness of the dried film was 100 μm. The coated aluminum plate was placed at a depth of 1 m in the sea of the Suruga Bay. The coated aluminum plate was picked up after summer was over and no barnacles clinging to the plate were observed thus exhibiting the antifouling properties of the resin composition.

For comparison, plates coated with the resins before reaction with the metal compounds of Examples 1 and 2 experienced the dissolution of the resins and had many barnacles as large as 0.5 to 3 mm clinging thereto.

Similarly, uncoated aluminum plates had many barnacles as large as 0.5 to 3 mm clinging thereto.

The resin obtained by the present invention has an excellent stainproofing function and is suitably used in stainproof coatings.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A composition, which comprises:

an antifouling stainproof resin as an active ingredient, having at least one metal carboxylate group, said resin represented by the following formula:

$$Rp\text{---}COO\text{---}M\text{---}OH \quad (A)$$

wherein Rp is a substrate resin and M is a divalent metal atom and said resin has 0.1 to 1 mol of said divalent metal for every 1 mol of the carboxyl group, thereby providing anti-fouling properties to said composition; and a solvent having between 0.5 to 5% by weight of water.

2. The resin composition of claim 1, wherein the divalent metal atom comprises at least one metal selected from the group consisting of copper, zinc, calcium, magnesium and iron.

3. The resin composition of claim 1 wherein the substrate resin is a vinyl polymer having an acid value of 30 to 300.

4. A method for producing an antifouling stainproof resin composition comprising as an active ingredient, a second resin having at least one metal carboxylate group, said second resin represented by the following formula:

$$Rp\text{---}COO\text{---}M\text{---}OH \quad (A)$$

wherein Rp is a substrate resin and M is a divalent metal atom, the method comprising:

providing a mixture which comprises a first resin having at least one carboxyl group with a divalent metal oxide or a divalent metal hydroxide and a solvent, the majority by weight of said solvent being an organic compound, and reacting said first resin with said divalent metal oxide or said divalent metal hydroxide in said mixture to produce said second resin.

5. The method for producing a stainproof resin composition according to claim 4, wherein the divalent metal atom comprises at least one metal selected from the group consisting of copper, zinc, calcium, magnesium and iron.

6. The method for producing a stainproof resin composition according to claim 4, wherein the substrate resin is a vinyl polymer having an acid value of 30 to 300.

7. A reaction mixture for preparing an antifouling stainproof resin composition comprising as an active ingredient, a resin having at least one metal carboxylate group, said resin represented by the following formula:

$$Rp\text{---}COO\text{---}M\text{---}OH \quad (A)$$

wherein Rp is a substrate resin and M is a divalent metal atom, said reaction mixture produced by mixing a solvent having between 0.5 to 5% by weight of water, relative to a reaction mixture weight, with an oxide or hydroxide of said divalent metal atom and with said substrate resin.

8. The method according to claim 4, wherein said solvent comprises water at a concentration between 0.5 to 5% by weight, relative to a weight of said mixture.

9. The reaction mixture according to claim 7, wherein a majority by weight of said solvent is an organic compound.

* * * * *